United States Patent
Kaneko

(10) Patent No.: US 11,434,390 B2
(45) Date of Patent: Sep. 6, 2022

(54) TRANSPARENT COATING FILM FORMING COMPOSITION

(71) Applicant: SHIN-ETSU CHEMICAL CO., LTD., Tokyo (JP)

(72) Inventor: Tatsuro Kaneko, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 483 days.

(21) Appl. No.: 16/690,777

(22) Filed: Nov. 21, 2019

(65) Prior Publication Data
US 2020/0199406 A1 Jun. 25, 2020

(30) Foreign Application Priority Data
Dec. 25, 2018 (JP) .............................. JP2018-241154

(51) Int. Cl.
| | |
|---|---|
| C09D 183/16 | (2006.01) |
| C08K 5/01 | (2006.01) |
| C08K 5/06 | (2006.01) |
| C08K 5/5419 | (2006.01) |
| C09D 5/44 | (2006.01) |

(52) U.S. Cl.
CPC .............. C09D 183/16 (2013.01); C08K 5/01 (2013.01); C08K 5/06 (2013.01); C08K 5/5419 (2013.01); C09D 5/4496 (2013.01)

(58) Field of Classification Search
CPC ....... C09D 183/16; C08G 77/62; C08K 5/544
See application file for complete search history.

(56) References Cited

U.S. PATENT DOCUMENTS

| | | | |
|---|---|---|---|
| 5,922,411 A | 7/1999 | Shimizu et al. | |
| 2002/0034885 A1* | 3/2002 | Shindo ................ | C23C 18/1279 438/789 |
| 2003/0083453 A1* | 5/2003 | Lukacs, III ........... | C08G 77/54 528/10 |
| 2003/0164113 A1 | 9/2003 | Suzuki | |
| 2005/0279255 A1 | 12/2005 | Suzuki et al. | |
| 2012/0156893 A1 | 6/2012 | Ozaki et al. | |
| 2012/0160801 A1* | 6/2012 | Padmanaban ....... | H01L 21/0337 525/477 |
| 2013/0178595 A1 | 7/2013 | Yang et al. | |

FOREIGN PATENT DOCUMENTS

| | | | |
|---|---|---|---|
| CN | 1630578 A | 6/2005 | |
| CN | 1694936 A | 11/2005 | |
| CN | 102666666 A | 9/2012 | |
| JP | H09-031333 A | 2/1997 | |
| JP | H09-275135 A | 10/1997 | |
| JP | 2005-045230 A | 2/2005 | |
| JP | 2011-054898 A | 3/2011 | |
| KR | 2017/107276 A | * | 9/2017 |
| WO | 02/088269 A1 | 11/2002 | |
| WO | 02/090108 A2 | 11/2002 | |
| WO | 2004/039904 A1 | 5/2004 | |
| WO | 2011/079020 A1 | 6/2011 | |

OTHER PUBLICATIONS

Machine translation of KR 2017/107276 (no date).*
Jun. 2, 2020 Extended Search Report issued in European Patent Application No. 19218353.1.
Jan. 26, 2022 Office Action issued in Japanese Patent Application No. 201911259502.5.

* cited by examiner

Primary Examiner — Marc S Zimmer
(74) Attorney, Agent, or Firm — Oliff PLC

(57) ABSTRACT

A transparent coating film forming composition contains: (A) a polysilazane having units represented by the following formulae (1) and (2), and having predetermined modification rate and weight average molecular weight,

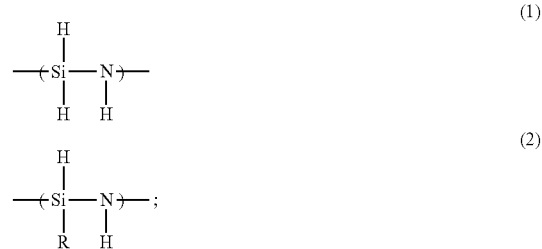

(B) an organic solvent containing (B-1) and (B-2), (B-1) an organic solvent having a dielectric constant of 2.1 to 15.0 on average and a higher boiling point under atmospheric pressure (1013 hPa) than that of an organic solvent contained as the component (B-2), and (B-2) a saturated aliphatic hydrocarbon organic solvent; and (C) a predetermined curing catalyst. The mixing ratio of the component (A) and the component (B) satisfies a predetermined range. This provides a transparent coating film forming composition using an organic solvent having high polysilazane solubility, volatility at an appropriate speed during application, high safety and workability, the composition enabling formation of a coating film that is uniform and has high transparency and hardness after curing.

16 Claims, No Drawings

TRANSPARENT COATING FILM FORMING COMPOSITION

TECHNICAL FIELD

The present invention relates to a transparent coating film forming composition enabling formation of a transparent and uniform glassy coating film, and having excellent workability and curability.

BACKGROUND ART

Since automobile bodies, building external walls, etc. are always exposed to the natural environment and are more prone to get dirty than in the indoor environment, it is common to apply a coating that makes it difficult for dirt to attach or easily removes attached dirt. Conventionally, organic paints such as acrylic and urethane and silicone based paints have been used, but the coating films of these paints have insufficient hardness in an outdoor environment where scratches due to flying stones etc. are likely to occur. In addition, when dirt is attached to the scratches, cleaning may be difficult.

In order to solve these problems, recently, a paint which provides a glassy coating film has been used. However, main paints actually employed are paints in which silica particles are mixed with an organic resin, and paints in which only a compound having a silazane structure is used as a part; there were few paints that can obtain hardness and film quality equivalent to those of silica glass by a simple construction method. In order to provide antifouling and high hardness while maintaining the appearance of the surface to be coated, it is desirable to form a glass coating film. However, there is almost no method for forming a uniform glass film on automobile bodies and building external walls in outdoor environment. Considering the application process and the curing process, it is currently easiest to use a perhydropolysilazane solution (see, for example, Patent Document 1). However, conventional paints supposed to have low odor properties have a low perhydropolysilazane content, and there is a problem that only a thin coating film can be obtained by one application.

Perhydropolysilazane has been studied for various uses as a material for forming moisture-proof films for electronic displays and semiconductor display devices such as organic EL display devices, interlayer insulation films in devices such as semiconductor and LED devices, passivation films, protective films, planarization films, etc. These films are formed by applying a coating solution containing perhydropolysilazane and a solvent for dissolving it to a substrate, and then performing a curing treatment to convert the perhydropolysilazane into a siliceous film (see, for example, Patent Documents 2 to 5). Conventionally, toluene, xylene, dibutyl ether, etc. are mainly used as a solvent for dissolving perhydropolysilazane. However, it has been pointed out that aromatic hydrocarbon based solvents such as toluene and xylene are harmful to health and are not necessarily safe. In addition, the above solvents have unique odors and may be uncomfortable for some workers when used in large amounts. Odor is an item that cannot be ignored by workers who work for a long period of time. When workers inhale an uncomfortable odor for a long time, they may experience headache, dizziness, nausea, loss of appetite, and in some cases, may vomit. Accordingly, aliphatic hydrocarbon based solvents are mentioned as excellent solvents with safety and low odor. These solvents are miscible in a very small amount because of poor solubility of perhydropolysilazane, but immediately generate white turbidity and precipitation when mixed in a large amount. Furthermore, when a catalyst for curing at room temperature is added, the whitening becomes remarkable, therefore, when a single aliphatic hydrocarbon based solvent is used, it is not miscible at an arbitrary concentration depending on the use and is difficult to use as a paint. The solubility in a solvent can be improved by substituting perhydropolysilazane with an organic group, but this is not preferable because the silica glass-like properties possessed by a perhydropolysilazane cured product are reduced. In addition, for use as a paint, the material should not be cured for a period of time during application, but must be cured at normal temperature as soon as it is applied. In this event, when the curing is too fast, the polymerization reaction proceeds before a solvent dries, and the polymer that has been polymerized but left undissolved may precipitate, resulting in whitening of the coating film. This whitening phenomenon is not preferable because it not only causes poor appearance of the coating film but also may significantly reduce various properties such as coating film strength. Conversely, when the curing speed is too slow, this increases the possibility that dust will attach to the coating film, therefore the curing needs to be done at an appropriate speed. For these reasons, it is difficult to obtain uniform transparent coating film that achieves silica glass-like properties, well balance between solvent safety and low odor, and workability at the same time. In order to solve these problems, provision of a transparent coating film forming composition that achieves the above-described objectives is awaited.

CITATION LIST

Patent Literatures

Patent Document 1: International Publication No. WO2002/088269
Patent Document 2: Japanese Patent Laid-Open Publication No. 2011-54898
Patent Document 3: Japanese Patent Laid-Open Publication No. 2005-45230
Patent Document 4: Japanese Patent Laid-Open Publication No. H9-031333
Patent Document 5: Japanese Patent Laid-Open Publication No. H9-275135

SUMMARY OF INVENTION

Technical Problem

The present invention has been made in view of the above circumstances. An object of the present invention is to provide a polysilazane-containing transparent coating film forming composition using an organic solvent having high polysilazane solubility, volatility at an appropriate speed during application, and high safety and workability such as low toxicity and weak odor, the composition enabling formation of a coating film that is uniform and has high transparency and hardness after curing.

Solution to Problem

In order to achieve the above object, the present invention provides a transparent coating film forming composition, comprising at least:

(A) a polysilazane having a unit represented by the following formula (1) and a unit represented by the following formula (2), wherein a ratio of the number of Si—R bonds in the formula (2) to a total number of Si—H bonds in the formula (1) and Si—H bonds in the formula (2) and the Si—R bonds in the formula (2) is 0.01 to 0.1, and the polysilazane has a weight average molecular weight in a range of 100 to 1,000,000,

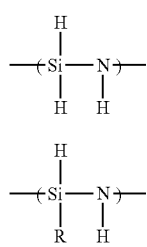

wherein R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in one polysilazane molecule are the same or different from each other;

(B) an organic solvent comprising (B-1) and (B-2) below, (B-1) an organic solvent having a dielectric constant in a range of 2.1 to 15.0 on average and a higher boiling point under atmospheric pressure (1013 hPa) than that of an organic solvent contained as the component (B-2) below, and (B-2) a saturated aliphatic hydrocarbon organic solvent; and (C) a curing catalyst which is an organosilicon compound having one or more alkoxysilyl groups and one or more amino groups in one molecule, wherein a mixing ratio of {component (A)/[component (A)+component (B)]} satisfies 0.005 to 0.2 as a mass ratio.

Such a transparent coating film forming composition is a polysilazane-containing transparent coating film forming composition using an organic solvent having high polysilazane solubility, volatility at an appropriate speed during application, and high safety and workability such as low toxicity and weak odor. This composition can form a coating film that is uniform and has high transparency and hardness after curing.

In addition, R in the formula (2) is preferably a methyl group.

When the polysilazane has a methyl group as a modifying group, the preparation becomes easier.

In addition, the component (B-1) preferably consists of two or more solvents, at least one of which has one or more ether groups or carboxyl groups in one molecule.

Furthermore, the component (B-1) preferably consists of two or more solvents, at least one of which has two or more ether groups in one molecule.

By using an organic solvent having functional groups as described above, effects such as improvement in the uniformity of the coating film and prevention of whitening can be obtained more suitably.

In addition, the transparent coating film forming composition preferably has a set-to-touch time of 30 minutes or less at 23° C. and 50% Rh described in JIS 5600-1-1:1999.

From such a transparent coating film forming composition, a transparent and uniform coating film with good workability can be obtained in a short time in the above conditions, too.

Advantageous Effects of Invention

As described above, the transparent coating film forming composition of the present invention is a transparent coating film forming composition containing organically modified polysilazane, two or more types of organic solvent, and a curing catalyst. The organic solvent dissolves polysilazane well and volatilizes at an appropriate speed. Thereby, a transparent coating film can be obtained because there is no coating film whitening, etc. Furthermore, safety can be improved and uncomfortable odor can be reduced. Therefore, it is possible to obtain a transparent coating film forming composition having better workability than before.

DESCRIPTION OF EMBODIMENTS

As described above, there have been demands for the development of a polysilazane-containing transparent coating film forming composition using an organic solvent having high polysilazane solubility, volatility at an appropriate speed during coating, and high safety and workability such as low toxicity and weak odor, the composition enabling formation of a coating film that is uniform and has high transparency and hardness after curing.

As a result of intensive studies on the above problems, the present inventor has found that when a transparent coating film forming composition contains polysilazane satisfying a modification rate in a predetermined range, predetermined two or more organic solvents in a predetermined mixing ratio, and a predetermined curing catalyst, these organic solvents dissolve the polysilazane well, can volatilize at an appropriate speed, and have high safety and workability. In addition, it has been found that such a transparent coating film forming composition can form a coating film that is uniform and has high transparency and hardness after curing. These findings have led to the completion of the present invention.

Namely, the present invention is a transparent coating film forming composition, comprising at least:

(A) a polysilazane having a unit represented by the following formula (1) and a unit represented by the following formula (2), wherein a ratio of the number of Si—R bonds in the formula (2) to a total number of Si—H bonds in the formula (1) and Si—H bonds in the formula (2) and the Si—R bonds in the formula (2) is 0.01 to 0.1, and the polysilazane has a weight average molecular weight in a range of 100 to 1,000,000,

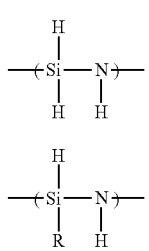

wherein R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in one polysilazane molecule are the same or different from each other;

(B) an organic solvent comprising (B-1) and (B-2) below,
(B-1) an organic solvent having a dielectric constant in a range of 2.1 to 15.0 on average and a higher boiling point under atmospheric pressure (1013 hPa) than that of an organic solvent contained as the component (B-2) below, and
(B-2) a saturated aliphatic hydrocarbon organic solvent; and
(C) a curing catalyst which is an organosilicon compound having one or more alkoxysilyl groups and one or more amino groups in one molecule,
wherein a mixing ratio of {component (A)/[component (A)+component (B)]} satisfies 0.005 to 0.2 as a mass ratio.

Hereinafter, the present invention will be described in detail, but the present invention is not limited to these.

Transparent Coating Film Forming Composition

As described above, the transparent coating film forming composition of the present invention contains, as essential components, at least polysilazane that is the following component (A), an organic solvent containing a component (B-1) and a component (B-2), and a curing catalyst that is a component (C).

Component (A): Polysilazane

The polysilazane in the present invention is a polysilazane having a unit represented by the following formula (1) and a unit represented by the following formula (2), in which a ratio of the number of Si—R bonds in the formula (2) to a total number of Si—H bonds in the formula (1) and Si—H bonds in the formula (2) and the Si—R bonds in the formula (2) (hereinafter, also expressed as "SiR/(SiR+SiH)") is 0.01 to 0.1, and the polysilazane has a weight average molecular weight in a range of 100 to 1,000,000.

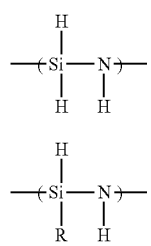

where R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in one polysilazane molecule are the same or different from each other.

In the present invention, SiR/(SiR+SiH) of the polysilazane is preferably 0.01 or more and 0.05 or less. If this ratio is less than 0.01, the solubility in organic solvents becomes poor. In addition, the ratio of greater than 0.1 is not preferable because the properties of the cured film deteriorate as compared with a silica glass film made of perhydropolysilazane.

In addition, when SiR/(SiR+SiH) is in the foregoing range, a silica glass-like cured product having properties equivalent to those of a perhydropolysilazane cured film can be produced after curing. Examples of the properties include hardness, gas barrier properties, light transmission properties, and heat resistance. Generally, these properties tend to decrease as the proportion of the perhydropolysilazane modified with an organic group increases.

R in the formula (2) is a group selected from an aliphatic hydrocarbon group having 1 to 6 carbon atoms, preferably 1 to 3 carbon atoms; an aromatic hydrocarbon group having 6 to 12 carbon atoms, preferably 6 to 8 carbon atoms; and an alkoxy group having 1 to 6 carbon atoms, preferably 1 to 3 carbon atoms. Examples of these groups include a methyl group, an ethyl group, a phenyl group, a methoxy group, an ethoxy group, and the like. R is preferably a methyl group. The polysilazane having a methyl group at R in the formula (2) can be prepared more easily. R can be appropriately selected for each repeating unit in one molecule of the polysilazane, and may be the same or different.

From the viewpoint of workability during application, the polysilazane in the present invention has a weight average molecular weight in the range of 100 to 1,000,000, preferably 1,000 to 500,000, more preferably 3,000 to 50,000 measured by gel permeation chromatography (GPC) using THF (tetrahydrofuran) as a dissolution solvent. The weight average molecular weight of less than 100 is not preferable because the volatility is so high that the film quality of the coating film may deteriorate during drying of the organic solvent and curing treatment. In addition, the weight average molecular weight of greater than 1,000,000 is not preferable because the polysilazane does not sufficiently dissolve in the organic solvent and may be precipitated unevenly in the solvent drying process after application.

Incidentally, the weight average molecular weight mentioned in the present invention refers to a weight average molecular weight measured by gel permeation chromatography (GPC) in terms of polystyrene standard under the following conditions.

Measurement Conditions
Developing solvent: tetrahydrofuran (THF)
Flow rate: 0.6 mL/min
Detector: UV detector
Column: TSK Guard column SuperH-L, TSK gel Super Multipore HZ-M (4.6 mm I.D.×15 cm×4) (both manufactured by Tosoh Corporation)
Column temperature: 40° C.
Sample injection volume: 20 μl (0.5 wt %-concentration THF solution)

Since polysilazane as the component (A) of the present invention reacts with moisture in the air and easily hydrolyzes, it is desirable to dilute and use polysilazane by using all or a part of the component (B-1) described below to make it easy to handle the polysilazane.

Component (B): Organic Solvent

As the dilution solvent for the polysilazane used in the present invention, a mixed solvent of (B-1) an organic solvent with a dielectric constant in the range of 2.1 to 15.0 on average and (B-2) a saturated aliphatic hydrocarbon organic solvent can be used. Note that the component (B-1) includes an organic solvent having a higher boiling point under atmospheric pressure (1013 hPa) than that of an organic solvent contained as the component (B-2).

Herein, the purpose of the component (B-1) is to improve the uniformity of the coating film and prevent whitening, and the purpose of the component (B-2) is to reduce odor and environmental load. By using these in combination, the coating film forming composition is excellent in workability and can provide a transparent polysilazane cured coating film.

(B-1): Organic Solvent with Dielectric Constant Ranging from 2.1 to 15.0 on Average.

The solubility of a polymer in a solvent is generally determined by the solubility parameter (SP value). However, the exact structure of polysilazane is not known and it is difficult to calculate the solubility parameter. In addition, even if the structure can be determined, analyzing the structure and calculating the solubility parameter for each synthesis cannot be said to be an efficient method. Accordingly, the present inventor has found that the solubility of polysilazane can be easily determined by selecting the solvent on the basis of the dielectric constant instead of the solubility parameter. As a result of study, it has been found that the polysilazane of the component (A) used in the present invention dissolves in a solvent having a dielectric constant of 2.1 or more, and particularly dissolves in a certain ratio in a solvent having a dielectric constant of 3.0 or more.

On one hand, it is known that when the dielectric constant increase, the polarity of a molecule generally increases, and it tends to absorb moisture. It is known that the polymerization reaction and curing reaction of polysilazane are accelerated by moisture, and storage stability is decreased when a highly hygroscopic solvent is used.

On the other hand, organic solvents such as aliphatic hydrocarbons with a low odor have low dielectric constant, and when used as a solvent for polysilazane, polysilazane cannot be completely dissolved and precipitates in a drying process after application, causing poor appearance such as whitening and non-homogeneous coating film.

Therefore, the dielectric constant of the organic solvent (B-1) used in the present invention is 2.1 or more and 15.0 or less on average, more preferably 3.0 or more and 5.0 or less, considering the solubility of the polysilazane compound. When the dielectric constant is less than 2.1, the solubility of polysilazane becomes insufficient. When the dielectric constant exceeds 15.0, the polysilazane compound may be hydrolyzed by moisture contained in the organic solvent.

The organic solvent used as the component (B-1) may be used alone or in combination of two or more kinds, preferably used in combination of two or more kinds, more preferably in combination of two or three kinds.

Incidentally, when two or more organic solvents are used in combination, the weighted average value of the dielectric constants of the respective organic solvents is regarded as the dielectric constant of the whole component (B-1). For example, when two organic solvents A and B are used in combination as the component (B-1), the dielectric constant ε of the entire mixed organic solvent can be obtained by the following equation.

$$\varepsilon = (\varepsilon_A \times w_A + \varepsilon_B \times w_B)/(w_A + w_B)$$

where $\varepsilon_A$ is the dielectric constant of the organic solvent A, $w_A$ is the blending amount, $\varepsilon_B$ is the dielectric constant of the organic solvent B, and $w_B$ is the blending amount. Incidentally, it is assumed that both $\varepsilon_A$ and $\varepsilon_B$ are within the above dielectric constant range.

Examples of the organic solvent having a dielectric constant of 2.1 or more and 15.0 or less include alkene compounds such as 1-octene, 1-nonene, 1-decene, 1-dodecene, and β-myrcene; cycloalkene compounds such as cyclohexene; terpene compounds such as p-menthane, d-limonene, 1-limonene, and dipentene; ester compounds such as n-propyl acetate, isopropyl acetate, n-butyl acetate, isobutyl acetate, isoamyl acetate, ethyl acetoacetate, and ethyl caproate; alkyl ether compounds such as diethyl ether and butyl ether; glycol ether compounds such as bis(2-methoxyethyl)ether, bis(2-ethoxyethyl)ether, and bis(2-butoxyethyl) ether; and the like. The optimum one can be selected depending on organic solvent(s) to be combined among them, the intended set-to-touch time, etc. Particularly, the component (B-1) preferably consists of two or more solvents, at least one of which has one or more ether groups or carboxyl groups in one molecule, more preferably at least one of the two or more solvents has two or more ether groups in one molecule.

In addition, in order to prevent polysilazane from being precipitated during application and drying as described above, an organic solvent capable of dissolving polysilazane at a certain concentration must be volatilized last. The order in which the organic solvents volatilize varies depending on the organic solvents to be combined. Hence, the order cannot be generally stated, but the component (B-1) has a higher boiling point under atmospheric pressure (1013 hPa) than that of an organic solvent contained as the component (B-2) described later, and preferably has a higher boiling point by 30° C. or more. Incidentally, when two or more kinds are used as the component (B-1), at least one of them should have a boiling point higher than that of the component (B-2). In addition, when two or more components (B-2) are used, the component (B-1) should have a boiling point higher than that of the component (B-2) having the highest boiling point among the two or more components (B-2).

As described above, the component (B-1) of the present invention is preferably used as a dilution solvent for the component (A) in whole or in part in the blending amount in order to improve the handling properties of polysilazane that is the component (A). When a part of the blending amount is used as the dilution solvent, the rest of the organic solvent may be the same or different type from the dilution solvent.

The amount of water contained in the component (B-1) is preferably 500 ppm or less, more preferably 300 ppm or less. Within this range, the polysilazane in the component (A) is not hydrolyzed with water in the organic solvent, and the stability over time and so forth of the transparent coating film forming composition of the present invention are improved.

Incidentally, in the present invention, the values described in "CRC Handbook of Chemistry and Physics 98th Edition" (CRC Press, LLC) are adopted as the dielectric constant. In addition, the compounds not described therein were measured based on the method as described in JIS C 2101:2010.

(B-2) Saturated Aliphatic Hydrocarbon Organic Solvent

In the present invention, the "saturated aliphatic hydrocarbon organic solvent" refers to an organic solvent mainly composed of a saturated aliphatic hydrocarbon.

Organic solvents generate unique odors due to their molecular structures. Such odor greatly affects workability during coating. When an organic solvent volatilizes, workers are highly likely to inhale the vapor of the organic solvent. If the odor of the organic solvent is unpleasant in such a case, the workers may fall ill during the work. In addition, if the odor diffuses to the neighborhood, it may become a pollution problem in the worst case. Therefore, as the organic solvent to be used, it is preferable to select a material having an odor that is not unpleasant for many people as much as possible. In general, many of saturated aliphatic hydrocarbon compounds are almost odorless, easily accepted by everyone, and preferably used.

The saturated aliphatic hydrocarbon organic solvent used in the present invention preferably has 4 to 20 carbon atoms, more preferably 5 to 16 carbon atoms, and still more preferably 8 to 12 carbon atoms.

Specific examples include saturated open-chain aliphatic hydrocarbons such as n-pentane, i-pentane, n-hexane, i-hexane, n-heptane, i-heptane, n-octane, i-octane, 2,2,4-trimethylpentane (isooctane), n-nonane, i-nonane, n-decane, i-decane, and 2,2,4,6,6-pentamethylheptane (isododecane); saturated alicyclic hydrocarbons such as cyclopentane, cyclohexane, methylcyclohexane, dimethylcyclohexane, ethylcyclohexane, p-menthane, and decahydronaphthalene; and the like. In addition, for example, low odor solvents in which a plurality of saturated aliphatic hydrocarbons are mixed are also commercially available as paint diluents and cleaning agents, and these may be used. In addition, these organic solvents may be used singly or in combination of two or more, and any organic solvent can be selected depending on work environment and workability. Incidentally, the saturated aliphatic hydrocarbon organic solvent preferably has a purity of 95% or more, more preferably 99% or more, and may contain an organic compound other than the saturated aliphatic hydrocarbon as long as these purity ranges are satisfied.

In addition, the blending ratio of the component (B-1) and the component (B-2) is not particularly limited. It is most important that polysilazane should not precipitate during application and drying of the paint, but it is preferable to blend the component (B-1) and the component (B-2) in consideration of reducing odor, adjusting the set-to-touch time, etc.

In the present invention, the blending ratio of the polysilazane as the component (A) and the organic solvent as the component (B) (mixing ratio: {component (A)/[component (A)+component (B)]}) (hereinafter, also expressed as "A/(A+B)") satisfies the mass ratio of 0.005 to 0.2, preferably 0.01 to 0.1, and more preferably in the range of 0.02 to 0.05. If A/(A+B) is less than 0.005, that is, if the polysilazane is less than 0.5 parts by mass with respect to 100 parts by mass of the polysilazane solution, a coating film having a sufficient thickness cannot be obtained when the composition is applied. Meanwhile, if A/(A+B) is greater than 0.2, that is, if the polysilazane is greater than 20 parts by mass with respect to 100 parts by mass of the polysilazane solution, the polysilazane tends to precipitate during long-term storage of the transparent coating film forming composition of the present invention.

In addition, the water content in the transparent coating film forming composition of the present invention is preferably 500 ppm or less, and more preferably 300 ppm or less. The water content of 500 ppm or less is preferable because the polysilazane and the water do not react, and therefore, there is no possibility of generating heat, hydrogen gas and ammonia gas, thickening, gelation, etc.

Component (C): Curing Catalyst

A curing catalyst is added to the transparent coating film forming composition of the present invention so that the coating film can be formed even under conditions where heat cannot be applied, such as coating in outdoor environment or onto non-heat resistant organic substrates.

The curing catalyst used in the present invention is an organosilicon compound having one or more alkoxysilyl groups and one or more amino groups in one molecule. When such a curing catalyst is used, sufficient hardness can be imparted to the resulting coating film. Specific examples of the organosilicon compound include aminosilanes such as 3-aminopropylmethyldimethoxysilane, 3-aminopropyltriethoxysilane, 3-(2-aminoethylamino)propyltrimethoxysilane, and 3-(2-aminoethylamino)propylmethyldiethoxysilane. Preferable are 3-aminopropyltriethoxysilane, etc. from the viewpoints of curing speed and catalytic temperature. In addition, two or three or more of these catalysts may be added at an arbitrary ratio.

Specifically, the transparent coating film forming composition of the present invention is preferably a transparent coating film forming composition having a set-to-touch time of 30 minutes or less at 23° C. and 50% Rh described in JIS 5600-1-1:1999. The set-to-touch time is more preferably 5 to 10 minutes. In addition, it is preferable that the curing time of the coating film at 23° C.×50% Rh is 24 hours or less. Within this range, even in the above conditions, the workability is good, and a transparent and uniform coating film can be obtained in a short time. The curing time in the present invention refers to the time until the pencil hardness of the coating film formed on a substrate having a pencil hardness of 5H or higher reaches 5H or higher. Specifically, the substrates having a pencil hardness of 5H or higher are glass, SUS304, SUS430, iron, etc.

Additives

The transparent coating film forming composition of the present invention may contain additives such as inorganic fillers in addition to the polysilazane, the organic solvent, and the curing catalyst. Examples of the inorganic fillers include metal fillers containing metal elements such as magnesium, aluminum, titanium, vanadium, chromium, manganese, iron, cobalt, zinc, gallium, zirconium, niobium, palladium, and platinum; reinforcing inorganic fillers such as fumed silica, fumed titanium dioxide, and fumed alumina; and non-reinforcing inorganic fillers such as fused silica, alumina, zirconium oxide, calcium carbonate, calcium silicate, titanium dioxide, ferric oxide, and zinc oxide; in addition, adhesive aids such as organosiloxane oligomers containing at least two, preferably two or three functional groups selected from a hydrosilyl group, an alkenyl group, an alkoxysilyl group, and an epoxy group, organooxysilyl-modified isocyanurate compounds, and hydrolysis condensates thereof; silicone oils such as dimethyl silicones and phenyl silicones; and the like. These can be added at an arbitrary ratio.

Method for Forming Transparent Coating Film

The transparent coating film forming composition of the present invention can be used as it is as a coating composition. Examples of the method for applying the transparent coating film forming composition include a roll coating method using a chamber doctor coater, a single roll kiss coater, a reverse kiss coater, a bar coater, a reverse roll coater, a forward rotation roll coater, a blade coater, a knife coater, or the like; a spin coating method; a dispensing method; a dip method; a spray method; a transfer method; a slit coat method; and the like. In addition, in a case where the above application methods cannot be used, it is possible to use a wipe coating method in which a certain cloth, paper, or the like is soaked into the coating film forming composition and applied to a substrate with hand.

Examples of the substrate to be coated include silicon substrates, glass substrates, metal substrates, resin substrates, resin films, and the like. If necessary, the composition may be applied to, for example, a substrate provided with a semiconductor film or a circuit in the process of forming a semiconductor device. The thickness of the coating film varies depending on the purpose of use of the film, and so forth, but is generally 10 to 100,000 nm, preferably 100 to 1,000 nm as a cured film thickness.

After forming the polysilazane resin coating film by applying the transparent coating film forming composition in this way, it is preferable to leave the coating film standing for curing the coating film. The purpose of this step is to promote removal of the solvent contained in the coating film and a changing reaction from the polysilazane to a polysiloxane bond with the catalyst.

This standing step may be carried out at room temperature (25° C.) or heating may be performed if possible. The heating is preferably performed at 50 to 150° C. The time for performing the standing step is optimized as appropriate depending on conditions such as temperature and humidity, but it is desirable to leave the coating film standing at least until it reaches the set-to-touch state.

The "set-to-touch state" refers to a state in which a fingertip is not soiled by lightly touching the center of the coated surface with the fingertip, as described in JIS 5600-1-1:1999. As a guideline, it is preferable to reach the set-to-touch state at 23° C. and 50% Rh within 30 minutes; more preferably, complete curing is achieved within 24 hours under these conditions.

EXAMPLE

Hereinafter, the present invention will be specifically described by showing Synthesis Examples, Examples, and Comparative Examples, but this invention is not limited to the following Examples. Incidentally, in the following Examples, part(s) represent part(s) by mass, and boiling point refers to the boiling point under atmospheric pressure (1013 hPa). In addition, normal temperature means that the temperature condition is in the range of 5 to 35° C. as described in JIS Z 8703:1993.

Synthesis Example 1

Into 300 ml of dehydrated pyridine at −10° C., 0.189 mol of dichlorosilane and 0.02 mol of methyldichlorosilane both having a purity of 99% or more were blown with stirring together with nitrogen gas. Then, 0.63 mol of ammonia having a purity of 99% or more was blown, and the produced salt was removed by pressure filtration to obtain a polysilazane solution. This polysilazane solution was heated to 150° C. and 150 ml of the pyridine was distilled out. Then, 300 ml of di-n-butyl ether (hereinafter abbreviated as "dibutyl ether") was added, the pyridine was distilled out by azeotropic distillation, and dibutyl ether was added and adjusted such that with respect to 100 parts of the whole solution, polysilazane was 50 parts by mass as a mass ratio. Thus, a polysilazane-containing composition (a-1) was obtained. The weight average molecular weight of the resultant polysilazane (A-1) was 3,288, and the ratio of the number of Si—CH$_3$ bonds to the total number of Si—H bonds and Si—CH$_3$ bonds was 0.05.

Synthesis Example 2

Into 300 ml of dehydrated pyridine at −10° C., 0.189 mol of dichlorosilane and 0.004 mol of methyldichlorosilane both having a purity of 99% or more were blown with stirring together with nitrogen gas. Then, 0.58 mol of ammonia having a purity of 99% or more was blown, and the produced salt was removed by pressure filtration to obtain a polysilazane solution. This polysilazane solution was heated to 150° C. and 150 ml of the pyridine was distilled out. Then, 300 ml of dibutyl ether was added, the pyridine was distilled out by azeotropic distillation, and dibutyl ether was added and adjusted such that with respect to 100 parts of the whole solution, polysilazane was 50 parts by mass as a mass ratio. Thus, a polysilazane-containing composition (a-2) was obtained. The weight average molecular weight of the resultant polysilazane (A-2) was 5,312, and the ratio of the number of Si—CH$_3$ bonds to the total number of Si—H bonds and Si—CH$_3$ bonds was 0.01.

Synthesis Example 3

Into 300 ml of dehydrated pyridine at −10° C., 0.189 mol of dichlorosilane having a purity of 99% or more was blown with stirring together with nitrogen gas. Then, 0.57 mol of ammonia having a purity of 99% or more was blown, and the produced salt was removed by pressure filtration to obtain a polysilazane solution. This polysilazane solution was heated to 150° C. and 150 ml of the pyridine was distilled out. Then, 300 ml of dibutyl ether was added, the pyridine was distilled out by azeotropic distillation, and dibutyl ether was added and adjusted such that with respect to 100 parts of the whole solution, polysilazane was 50 parts by mass as a mass ratio. Thus, a polysilazane-containing composition (a-3) was obtained. The weight average molecular weight of the resultant polysilazane (A-3) was 6,725.

Synthesis Example 4

Into 300 ml of dehydrated pyridine at −10° C., 0.076 mol of dichlorosilane and 0.038 mol of methyldichlorosilane both having a purity of 99% or more were blown with stirring together with nitrogen gas. Then, 0.35 mol of ammonia having a purity of 99% or more was blown, and the produced salt was removed by pressure filtration to obtain a polysilazane solution. This polysilazane solution was heated to 150° C. and 150 ml of the pyridine was distilled out. Then, 300 ml of dibutyl ether was added, the pyridine was distilled out by azeotropic distillation, and dibutyl ether was added and adjusted such that with respect to 100 parts of the whole solution, polysilazane was 50 parts by mass as a mass ratio. Thus, a polysilazane-containing composition (a-4) was obtained. The weight average molecular weight of the resultant polysilazane (A-4) was 1,796, and the ratio of the number of Si—CH$_3$ bonds to the total number of Si—H bonds and Si—CH$_3$ bonds was 0.2.

Example 1

The polysilazane-containing composition (a-1) obtained in Synthesis Example 1 (solution of polysilazane (A-1) in 50% by mass of dibutyl ether) was blended with bis[2-(n-butoxy)ethyl]ether (hereinafter abbreviated as "bis(2-butoxyethyl)ether", boiling point: 255° C.) as the organic solvent (B-1), EXXSOL D40 (mineral spirit containing a saturated hydrocarbon having 9 to 16 carbon atoms, boiling point: 166 to 191° C., manufactured by Exxon Mobil Corporation) as the organic solvent (B-2), and aminopropyltriethoxysilane as the curing catalyst (C) such that (a-1):(B-1):(B-2):(C) was 1:3:96:0.025 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 2

The polysilazane-containing composition (a-1) obtained in Synthesis Example 1 was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2):(C) was 10:3:87:0.25 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 3

The polysilazane-containing composition (a-1) obtained in Synthesis Example 1 was blended with bis(2-butoxyethyl)ether as the organic solvent (B-1), n-octane (boiling point: 125° C.) as the organic solvent (B-2), and aminopropyltriethoxysilane as the curing catalyst (C) such that (a-1): (B-1):(B-2):(C) was 10:3:87:0.25 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 4

The polysilazane-containing composition (a-1) obtained in Synthesis Example 1 was blended with ethyl caproate (boiling point: 168° C.) as the organic solvent (B-1), n-octane as the organic solvent (B-2), and aminopropyltriethoxysilane as the curing catalyst (C) such that (a-1):(B-1):(B-2):(C) was 10:3:87:0.25 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 5

The polysilazane-containing composition (a-1) obtained in Synthesis Example 1 was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2):(C) was 40:3:57:1 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 6

The polysilazane-containing composition (a-2) obtained in Synthesis Example 2 (solution of polysilazane (A-2) in 50% by mass of dibutyl ether) was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-2):(B-1):(B-2):(C) was 10:3:87:0.25 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 7

The polysilazane-containing composition (a-1) obtained in Synthesis Example 1 was blended with heptane (boiling point: 98° C.) as the organic solvent (B-2) and aminopropyltriethoxysilane as the curing catalyst (C) such that (a-1):(B-2):(C) was 10:90:0.25 to obtain a transparent coating film forming composition. Incidentally, the organic solvent (B-1) is dibutyl ether contained in the polysilazane-containing composition (a-1). When this transparent coating film forming composition was applied to a glass plate, a colorless and transparent coating film was obtained, and a cured film sufficiently cured at 25° C. and 40% RH for 24 hours was obtained.

Example 8

The polysilazane-containing composition (a-1) obtained in Synthesis Example 1 was blended with bis(2-butoxyethyl)ether and 1-octene (boiling point: 121.3° C.) as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2):(C) was 10:30:60:0.25 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Example 9

The polysilazane-containing composition (a-1) obtained in Synthesis Example 1 was blended with bis(2-butoxyethyl)ether and 2-hexanone (boiling point: 127.6° C.) as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2):(C) was 10:30:60:0.25 to obtain a transparent coating film forming composition. When this transparent coating film forming composition was applied to a glass plate, a colorless and transparent coating film was obtained, and a cured film sufficiently cured at 25° C. and 40% RH for 24 hours was obtained.

Comparative Example 1

The polysilazane-containing composition (a-3) obtained in Synthesis Example 3 (solution of polysilazane (A-3) in 50% by mass of dibutyl ether) was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-3):(B-1):(B-2):(C) was 10:3:87:0.25 to obtain a coating film forming composition. When this coating film forming composition was applied to a glass plate, a cloudy coating film was obtained, and the film was peeled off when touched with a finger after 24 hours under 25° C. and 40% RH.

Comparative Example 2

The polysilazane-containing composition (a-4) obtained in Synthesis Example 4 (solution of polysilazane (A-4) in 50% by mass of dibutyl ether) was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-4):(B-1):(B-2):(C) was 10:3:87:0.25 to obtain a coating film forming composition. When this coating film forming composition was applied to a glass plate, a colorless and transparent coating film was obtained, and a cured film sufficiently cured at 25° C. and 40% RH for 24 hours was obtained.

Comparative Example 3

The polysilazane-containing composition (a-1) obtained in Synthesis Example 1 was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2):(C) was 0.6:3:96.4: 0.015 to obtain a coating film forming composition. When this coating film forming composition was applied to a glass plate, a very thin non-uniform colorless and transparent coating film was obtained, and a cured film sufficiently cured at 25° C. and 40% RH for 24 hours was obtained.

Comparative Example 4

The polysilazane-containing composition (a-1) obtained in Synthesis Example 1 was blended with bis(2-butoxyethyl)ether as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2):(C) was 80:3:17:2 to obtain a coating film forming composition. When this coating film forming composition was applied to a glass plate, a colorless and transparent coating film was obtained, and a cured film sufficiently cured at 25° C. and 40% RH for 24 hours was obtained, but many cracks were generated.

Comparative Example 5

The polysilazane-containing composition (a-1) obtained in Synthesis Example 1 was blended with EXXSOL D40 (manufactured by Exxon Mobil Corporation) as the organic solvent (B-2) and aminopropyltriethoxysilane as the curing catalyst (C) such that (a-1):(B-2):(C) was 10:90:0.25 to obtain a coating film forming composition. When this coating film forming composition was applied to a glass plate, a cloudy coating film was obtained, and the film was peeled off when touched with a finger after 24 hours under 25° C. and 40% RH.

Comparative Example 6

The polysilazane-containing composition (a-1) obtained in Synthesis Example 1 was blended with benzaldehyde (boiling point: 178° C.) as the organic solvent (B-1), EXXSOL D40 (manufactured by Exxon Mobil Corporation) as the organic solvent (B-2), and aminopropyltriethoxysilane as the curing catalyst (C) such that (a-1):(B-1):(B-2): (C) was 10:3:87:0.25 to obtain a coating film forming composition. When this coating film forming composition was applied to a glass plate, a cloudy coating film was obtained, and the film was peeled off when touched with a finger after 24 hours under 25° C. and 40% RH.

Comparative Example 7

The polysilazane-containing composition (a-1) obtained in Synthesis Example 1 was blended with bis(2-butoxyethyl)ether as the organic solvent (B-1), EXXSOL D40 (manufactured by Exxon Mobil Corporation) as the organic solvent (B-2), and N,N'-bis(3-aminopropyl)ethylenediamine as the curing catalyst (C) such that (a-1):(B-1):(B-2):(C) was 10:3:87:0.25 to obtain a coating film forming composition. When this coating film forming composition was applied to a glass plate, a cloudy coating film was obtained, and the film was peeled off when touched with a finger after 24 hours under 25° C. and 40% RH.

Comparative Example 8

The polysilazane-containing composition (a-3) obtained in Synthesis Example 3 was blended with dibutyl ether (boiling point: 141° C.) as the organic solvent (B-1) and aminopropyltriethoxysilane as the curing catalyst (C) such that (a-3):(B-1):(C) was 10:90:0.25 to obtain a coating film forming composition. When this coating film forming composition was applied to a glass plate, a colorless and transparent coating film was obtained, and a colorless and transparent cured film sufficiently cured at 25° C. and 40% RH for 24 hours was obtained.

Comparative Example 9

The polysilazane-containing composition (a-1) obtained in Synthesis Example 1 was blended with n-tetradecane (boiling point: 253.6° C.) instead of the organic solvent (B-1), EXXSOL D40 (manufactured by Exxon Mobil Corporation) as the organic solvent (B-2), and aminopropyltriethoxysilane as the curing catalyst (C) such that (a-1):n-tetradecane:(B-2):(C) was 10:3:87:0.25 to obtain a coating film forming composition. When this coating film forming composition was applied to a glass plate, a cloudy coating film was obtained, and the film was peeled off when touched with a finger after 24 hours under 25° C. and 40% RH.

Comparative Example 10

The polysilazane-containing composition (a-1) obtained in Synthesis Example 1 was blended with 3-methyl-1-butanol (boiling point: 131° C.) instead of the organic solvent (B-1), n-octane as the organic solvent (B-2), and aminopropyltriethoxysilane as the curing catalyst (C) such that (a-1):3-methyl-1-butanol:(B-2):(C) was 10:3:87:0.25 to obtain a coating film forming composition. When this coating film forming composition was applied to a glass plate, gelation occurred during the application, and a uniform film was not obtained.

The following evaluations were carried out on each coating film obtained in Examples 1 to 9 and Comparative Examples 1 to 10 above.

Appearance

Each resultant coating film was visually evaluated to determine whether the polysilazane was sufficiently dissolved in the solvent.

Pencil Hardness

The pencil hardness was measured using a pencil hardness tester (manufactured by Pepaless Co., Ltd.). The measurement sample was applied to a test piece made of SUS 430 using a spin coater so as to have a coating film thickness of 1.0 μm, and cured by heating at 150° C. for 48 hours.

Odor Evaluation

Five panelists sniffed the odor of each composition prepared in Examples and Comparative Examples, and evaluated the odor by the number of persons who sensed a slight odor according to the following evaluation criteria. Incidentally, prior to the evaluation, the five panelists evaluated the same evaluation standard sample, and agreed to judge that there was a slight odor when the odor of a composition was equivalent to or below this standard.

Good: 4 to 5 people

Medium: 2 to 3 people

Bad: 0 to 1 person

The results of Examples and Comparative Examples are shown in Table 1.

TABLE 1

| | (A)Polysilazane | | | | (B-1) |
|---|---|---|---|---|---|
| | | Molecular Weight | Organic Group | SiR/(SiR + SiH) | Solvent Type |
| Example 1 | A-1 | 3,288 | Methyl Group | 0.05 | Bis(2-butoxyethyl)ether<br>Dibutyl ether |
| Example 2 | A-1 | 3,288 | Methyl Group | 0.05 | Bis(2-butoxyethyl)ether<br>Dibutyl ether |
| Example 3 | A-1 | 3,288 | Methyl Group | 0.05 | Bis(2-butoxyethyl)ether<br>Dibutyl ether |
| Example 4 | A-1 | 3,288 | Methyl Group | 0.05 | Ethyl caproate<br>Dibutyl ether |
| Example 5 | A-1 | 3,288 | Methyl Group | 0.05 | Bis(2-butoxyethyl)ether<br>Dibutyl ether |
| Example 6 | A-2 | 5,312 | Methyl Group | 0.01 | Bis(2-butoxyethyl)ether<br>Dibutyl ether |
| Example 7 | A-1 | 3,288 | Methyl Group | 0.05 | Dibutyl ether |
| Example 8 | A-1 | 3,288 | Methyl Group | 0.05 | Bis(2-butoxyethyl)ether<br>Dibutyl ether<br>1-octene |
| Example 9 | A-1 | 3,288 | Methyl Group | 0.05 | Bis(2-butoxyethyl)ether<br>Dibutyl ether<br>2-hexanone |
| Comparative Example 1 | A-3 | 6,725 | — | 0 | Bis(2-butoxyethyl)ether<br>Dibutyl ether |
| Comparative Example 2 | A-4 | 1,796 | Methyl Group | 0.2 | Bis(2-butoxyethyl)ether<br>Dibutyl ether |
| Comparative Example 3 | A-1 | 3,288 | Methyl Group | 0.05 | Bis(2-butoxyethyl)ether<br>Dibutyl ether |
| Comparative Example 4 | A-1 | 3,288 | Methyl Group | 0.05 | Bis(2-butoxyethyl)ether<br>Dibutyl ether |
| Comparative Example 5 | A-1 | 3,288 | Methyl Group | 0.05 | Dibutyl ether |
| Comparative Example 6 | A-1 | 3,288 | Methyl Group | 0.05 | Benzaldehyde<br>Dibutyl ether |
| Comparative Example 7 | A-1 | 3,288 | Methyl Group | 0.05 | Bis(2-butoxyethyl)ether<br>Dibutyl ether |
| Comparative Example 8 | A-3 | 6,725 | — | 0 | Dibutyl ether |
| Comparative Example 9 | A-1 | 3,288 | Methyl Group | 0.05 | n-Tetradecane<br>Dibutyl ether |
| Comparative Example 10 | A-1 | 3,288 | Methyl Group | 0.05 | 3-methyl-1-butanol<br>Dibutyl ether |

| | (B-1) | | | | (B-2) | |
|---|---|---|---|---|---|---|
| | Boiling Point (° C.) | Dielectric Constant | Blending Ratio | Overall Dielectric Constant | Solvent Type | Boiling Point (° C.) |
| Example 1 | 255<br>141 | 3.4<br>3.0 | 0.14<br>0.86 | 3.1 | EXXSOL D40 | 166-191 |
| Example 2 | 255<br>141 | 3.4<br>3.0 | 0.38<br>0.63 | 3.2 | EXXSOL D40 | 166-191 |
| Example 3 | 255<br>141 | 3.4<br>3.0 | 0.38<br>0.63 | 3.2 | n-Octane | 125 |
| Example 4 | 168<br>141 | 4.5<br>3.0 | 0.38<br>0.63 | 3.6 | n-Octane | 125 |
| Example 5 | 255<br>141 | 3.4<br>3.0 | 0.13<br>0.87 | 3.1 | EXXSOL D40 | 166-191 |
| Example 6 | 255<br>141 | 3.4<br>3.0 | 0.38<br>0.63 | 3.2 | EXXSOL D40 | 166-191 |
| Example 7 | 141 | 3.0 | 1.00 | 3.0 | Heptane | 98 |
| Example 8 | 255<br>141<br>121.3 | 3.4<br>3.0<br>2.1 | 0.01<br>0.04<br>0.95 | 2.1 | EXXSOL D40 | 166-191 |
| Example 9 | 255<br>141<br>127.6 | 3.4<br>3.0<br>14.6 | 0.01<br>0.03<br>0.96 | 14.2 | EXXSOL D40 | 166-191 |
| Comparative Example 1 | 255<br>141 | 3.4<br>3.0 | 0.38<br>0.63 | 3.2 | EXXSOL D40 | 166-191 |
| Comparative Example 2 | 255<br>141 | 3.4<br>3.0 | 0.38<br>0.63 | 3.2 | EXXSOL D40 | 166-191 |
| Comparative Example 3 | 255<br>141 | 3.4<br>3.0 | 0.91<br>0.09 | 3.4 | EXXSOL D40 | 166-191 |
| Comparative Example 4 | 255<br>141 | 3.4<br>3.0 | 0.07<br>0.93 | 3.0 | EXXSOL D40 | 166-191 |
| Comparative Example 5 | 141 | 3.0 | 1.00 | 3.0 | EXXSOL D40 | 166-191 |
| Comparative Example 6 | 178<br>141 | 17.9<br>3.0 | 0.38<br>0.63 | 8.6 | EXXSOL D40 | 166-191 |

TABLE 1-continued

| | | | | | | |
|---|---|---|---|---|---|---|
| Comparative Example 7 | 255 141 | 3.4 3.0 | 0.38 0.63 | 3.2 | EXXSOL D40 | 166-191 |
| Comparative Example 8 | 141 | 3.0 | 1.00 | 3.0 | — | — |
| Comparative Example 9 | 253.6 141 | 2.0 3.0 | 0.38 0.63 | — | EXXSOL D40 | 166-191 |
| Comparative Example 10 | 131 141 | 15.2 3.0 | 0.38 0.63 | — | n-Octane | 125 |

| | Finally Volatilized Solvent | (C) Catalyst Type | Blending Ratio A/(A + B) | Evaluation Coating Film Appearance | Odor | Pencil Hardness |
|---|---|---|---|---|---|---|
| Example 1 | Bis(2-butoxy-ethyl)ether | Aminopropyltri-ethoxysilane | 0.005 | Colorless and Transparent | Good | 7H |
| Example 2 | Bis(2-butoxy-ethyl)ether | Aminopropyltri-ethoxysilane | 0.05 | Colorless and Transparent | Good | 7H |
| Example 3 | Bis(2-butoxy-ethyl)ether | Aminopropyltri-ethoxysilane | 0.05 | Colorless and Transparent | Good | 7H |
| Example 4 | Ethyl caproate | Aminopropyltri-ethoxysilane | 0.05 | Colorless and Transparent | Good | 7H |
| Example 5 | Bis(2-butoxy-ethyl)ether | Aminopropyltri-ethoxysilane | 0.2 | Colorless and Transparent | Good | 7H |
| Example 6 | Bis(2-butoxy-ethyl)ether | Aminopropyltri-ethoxysilane | 0.05 | Colorless and Transparent | Good | 7H |
| Example 7 | Dibutyl ether | Aminopropyltri-ethoxysilane | 0.05 | Colorless and Transparent | Good | 7H |
| Example 8 | Bis(2-butoxy-ethyl)ether | Aminopropyltri-ethoxysilane | 0.05 | Colorless and Transparent | Good | 7H |
| Example 9 | Bis(2-butoxy-ethyl)ether | Aminopropyltri-ethoxysilane | 0.05 | Colorless and Transparent | Good | 7H |
| Comparative Example 1 | Bis(2-butoxy-ethyl)ether | Aminopropyltri-ethoxysilane | 0.05 | White | Good | Not Measurable |
| Comparative Example 2 | Bis(2-butoxy-ethyl)ether | Aminopropyltri-ethoxysilane | 0.05 | Colorless and Transparent | Good | 6H |
| Comparative Example 3 | Bis(2-butoxy-ethyl)ether | Aminopropyltri-ethoxysilane | 0.003 | Colorless and Transparent | Good | Not Measurable |
| Comparative Example 4 | Bis(2-butoxy-ethyl)ether | Aminopropyltri-ethoxysilane | 0.4 | Colorless and Transparent, Crack | Good | 7H |
| Comparative Example 5 | EXXSOL D40 | Aminopropyltri-ethoxysilane | 0.05 | White | Good | Not Measurable |
| Comparative Example 6 | EXXSOL D40 | Aminopropyltri-ethoxysilane | 0.05 | White | Good | Not Measurable |
| Comparative Example 7 | Bis(2-butoxy-ethyl)ether | N,N'-bis(3-aminopropyl)eth-ylenediamine | 0.05 | White | Good | Not Measurable |
| Comparative Example 8 | Dibuthylyl ether | Aminopropyltri-ethoxysilane | 0.05 | Colorless and Transparent | Bad | 7H |
| Comparative Example 9 | EXXSOL D40 | Aminopropyltri-ethoxysilane | 0.05 | White | Good | Not Measurable |
| Comparative Example 10 | Dibutyl ether | Aminopropyltri-ethoxysilane | 0.05 | Gel | Good | Not Measurable |

From the results of Table 1, in Examples 1 to 9 and Comparative Examples 4, 8, the coating films were colorless and transparent, and the pencil hardness was 7H. However, in Comparative Example 4, cracks were generated in the coating film during the curing; in Comparative Example 8, a strong odor of dibutyl ether was felt which was the only organic solvent used during the application.

In addition, in Comparative Example 1 in which the SiR/(SiR+SiH) value is outside the range of the present invention, in Comparative Examples 5, 6 in which the boiling point of the component (B-1) is lower than that of the component (B-2), and in Comparative Example 7 in which the organosilicon compound having one or more alkoxysilyl groups and one or more amino groups in one molecule was not used as the curing catalyst, the coating films were whitened and brittle, so that it was impossible to measure the pencil hardness.

In Comparative Example 2 in which the SiR/(SiR+SiH) value was greater than the upper limit of the range of the present invention, the properties of the cured film were inferior to those of the present invention.

In Comparative Example 3 in which the A/(A+B) value was smaller than the lower limit of the range of the present invention, the coating film was too thin to measure the pencil hardness.

In Comparative Example 9 also using the organic solvent which had a dielectric constant smaller than the lower limit of the range of the present invention, the coating film was whitened and brittle, so that it was impossible to measure the pencil hardness. On the other hand, in Comparative Example 10 using the organic solvent which had a dielectric constant greater than the upper limit of the range of the present invention, it was impossible to measure the pencil hardness because of gelation.

The odors in Examples 1 to 9 and Comparative Examples 1 to 7 and 9 to 10 were weak hydrocarbon-based odors.

From the above results, in Examples 1 to 9 using the transparent coating film forming composition of the present invention, the appearance of the coating films was colorless and transparent, and the pencil hardness of the coating films achieved 7H which is equivalent to that of the perhydropolysilazane of Comparative Example 8. In addition, the odor which is a problem of Comparative Example 8 was greatly reduced.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A transparent coating film forming composition, comprising at least:
(A) a polysilazane having a unit represented by the following formula (1) and a unit represented by the following formula (2), wherein a ratio of the number of Si—R bonds in the formula (2) to a total number of Si—H bonds in the formula (1) and Si—H bonds in the formula (2) and the Si—R bonds in the formula (2) is 0.01 to 0.1, and the polysilazane has a weight average molecular weight in a range of 100 to 1,000,000,

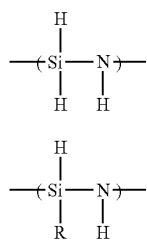

wherein R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in one polysilazane molecule are the same or different from each other;
(B) an organic solvent comprising (B-1) and (B-2) below,
   (B-1) an organic solvent having a dielectric constant in a range of 2.1 to 15.0 on average and a higher boiling point under atmospheric pressure (1013 hPa) than that of an organic solvent contained as the component (B-2) below, and
   (B-2) a saturated aliphatic hydrocarbon organic solvent; and
(C) a curing catalyst which is an organosilicon compound having one or more alkoxysilyl groups and one or more amino groups in one molecule,
wherein a mixing ratio of {component (A)/[component (A)+component (B)]} satisfies 0.005 to 0.2 as a mass ratio.

2. The transparent coating film forming composition according to claim 1, wherein R in the formula (2) is a methyl group.

3. The transparent coating film forming composition according to claim 1, wherein the component (B-1) consists of two or more solvents, at least one of which has one or more ether groups or carboxyl groups in one molecule.

4. The transparent coating film forming composition according to claim 2, wherein the component (B-1) consists of two or more solvents, at least one of which has one or more ether groups or carboxyl groups in one molecule.

5. The transparent coating film forming composition according to claim 1, wherein the component (B-1) consists of two or more solvents, at least one of which has two or more ether groups in one molecule.

6. The transparent coating film forming composition according to claim 2, wherein the component (B-1) consists of two or more solvents, at least one of which has two or more ether groups in one molecule.

7. The transparent coating film forming composition according to claim 3, wherein the component (B-1) consists of two or more solvents, at least one of which has two or more ether groups in one molecule.

8. The transparent coating film forming composition according to claim 4, wherein the component (B-1) consists of two or more solvents, at least one of which has two or more ether groups in one molecule.

9. The transparent coating film forming composition according to claim 1, wherein the transparent coating film forming composition has a set-to-touch time of 30 minutes or less at 23° C. and 50% Rh described in JIS 5600-1-1: 1999.

10. The transparent coating film forming composition according to claim 2, wherein the transparent coating film forming composition has a set-to-touch time of 30 minutes or less at 23° C. and 50% Rh described in JIS 5600-1-1: 1999.

11. The transparent coating film forming composition according to claim 3, wherein the transparent coating film forming composition has a set-to-touch time of 30 minutes or less at 23° C. and 50% Rh described in JIS 5600-1-1: 1999.

12. The transparent coating film forming composition according to claim 4, wherein the transparent coating film forming composition has a set-to-touch time of 30 minutes or less at 23° C. and 50% Rh described in JIS 5600-1-1: 1999.

13. The transparent coating film forming composition according to claim 5, wherein the transparent coating film forming composition has a set-to-touch time of 30 minutes or less at 23° C. and 50% Rh described in JIS 5600-1-1: 1999.

14. The transparent coating film forming composition according to claim 6, wherein the transparent coating film forming composition has a set-to-touch time of 30 minutes or less at 23° C. and 50% Rh described in JIS 5600-1-1: 1999.

15. The transparent coating film forming composition according to claim 7, wherein the transparent coating film forming composition has a set-to-touch time of 30 minutes or less at 23° C. and 50% Rh described in JIS 5600-1-1: 1999.

16. The transparent coating film forming composition according to claim 8, wherein the transparent coating film forming composition has a set-to-touch time of 30 minutes or less at 23° C. and 50% Rh described in JIS 5600-1-1: 1999.

* * * * *